(12) United States Patent
Cochran et al.

(10) Patent No.: US 7,641,878 B2
(45) Date of Patent: Jan. 5, 2010

(54) FLY ASH BENEFICIATION SYSTEMS WITH SULFUR REMOVAL AND METHODS THEREOF

(75) Inventors: Joseph W. Cochran, Palm Harbor, FL (US); S. Frank Kirkconnell, St. Petersburg, FL (US)

(73) Assignee: PMI Ash Technologies, LLC, Cary, NC (US)

(*) Notice: Subject to any disclaimer, the term of this patent is extended or adjusted under 35 U.S.C. 154(b) by 585 days.

(21) Appl. No.: 11/358,575

(22) Filed: Feb. 21, 2006

(65) Prior Publication Data

US 2007/0193476 A1 Aug. 23, 2007

(51) Int. Cl.
*B01D 53/50* (2006.01)
*B01J 8/18* (2006.01)
*C04B 18/06* (2006.01)
*F23B 15/00* (2006.01)

(52) U.S. Cl. ............ 423/244.01; 423/244.07; 423/244.08; 106/405; 106/478; 106/DIG. 1; 422/139; 422/145; 422/146

(58) Field of Classification Search ............ 423/244.01, 423/244.07, 244.08; 106/405, 478, DIG. 1; 241/24.1; 110/218; 422/139, 145, 146
See application file for complete search history.

(56) References Cited

U.S. PATENT DOCUMENTS

| 2,546,570 | A | 3/1951 | Vance |
|---|---|---|---|
| 2,576,565 | A | 11/1951 | Brown |
| 3,328,180 | A | 6/1967 | Ban |
| 3,799,474 | A | 3/1974 | Scharzler |
| 3,825,501 | A | 7/1974 | Muenger |
| 3,979,168 | A | 9/1976 | Chauvin |
| 4,003,986 | A | 1/1977 | Lewis, Jr. |
| 4,034,063 | A | 7/1977 | Rosar et al. |
| 4,043,831 | A | 8/1977 | Friedman |
| 4,064,219 | A | 12/1977 | Yamashita et al. |

(Continued)

FOREIGN PATENT DOCUMENTS

CN 1195573 A 1/2009

(Continued)

OTHER PUBLICATIONS

"Combustion: Fossil Power Systems," published by Combustion Engineering, Inc., 3rd Edition, 1981, p. 24-23.

(Continued)

*Primary Examiner*—Timothy C Vanoy
(74) *Attorney, Agent, or Firm*—Nixon Peabody LLP

(57) ABSTRACT

A system and method for beneficiation of fly ash particles which at least partially reduces sulfur emissions includes at least one mixing reactor with a chamber and at least one exhaust, at least one fly ash source connected to provide fly ash particles to the chamber, at least one sorbent source, and at least one fluid supply system. The sorbent source provides at least one type of sorbent particles to be mixed with the fly ash particles to reduce sulfur emissions. A mass of the fly ash particles in the chamber is greater than a mass of the sorbent particles in the chamber. The fluid supply system provides at least one fluid to the chamber during a beneficiation of at least a portion of the fly ash particles in the chamber.

43 Claims, 6 Drawing Sheets

U.S. PATENT DOCUMENTS

| | | | |
|---|---|---|---|
| 4,121,945 | A | 10/1978 | Hurst et al. |
| 4,304,659 | A | 12/1981 | Pratt et al. |
| 4,325,833 | A | 4/1982 | Scott |
| 4,341,623 | A | 7/1982 | Bertolacini et al. |
| 4,432,800 | A * | 2/1984 | Kneller et al. ............... 106/697 |
| 4,450,777 | A * | 5/1984 | Wolfrum et al. ............ 110/342 |
| 4,705,409 | A | 11/1987 | Trerice |
| 4,911,900 | A | 3/1990 | Horch et al. |
| 4,959,334 | A | 9/1990 | Mauleon et al. |
| 5,051,245 | A | 9/1991 | Wilson et al. |
| 5,066,627 | A | 11/1991 | Owen et al. |
| 5,069,720 | A | 12/1991 | Epperly et al. |
| 5,153,838 | A * | 10/1992 | Kindig ...................... 700/117 |
| 5,160,539 | A | 11/1992 | Cochran |
| 5,273,727 | A | 12/1993 | Johnson |
| 5,399,194 | A | 3/1995 | Cochran |
| 5,525,317 | A | 6/1996 | Bhat et al. |
| 6,077,494 | A | 6/2000 | Gasiorowski et al. |
| 6,126,014 | A * | 10/2000 | Gray et al. .................. 209/163 |
| 6,290,066 | B1 | 9/2001 | Hwang |
| 6,422,392 | B1 | 7/2002 | Levy |
| 6,605,263 | B2 | 8/2003 | Alix et al. |
| 6,746,654 | B2 | 6/2004 | Mehta et al. |
| 6,755,901 | B1 | 6/2004 | Ramme et al. |
| 6,783,585 | B2 | 8/2004 | Zacarias et al. |
| 6,790,264 | B2 | 9/2004 | Minkara |
| 6,863,875 | B1 | 3/2005 | Kotake et al. |
| 7,223,375 | B1 | 5/2007 | Cochran |
| 2002/0189497 | A1 | 12/2002 | Tranquilla |
| 2003/0202927 | A1 | 10/2003 | Minkara et al. |
| 2004/0033184 | A1 * | 2/2004 | Greer ...................... 423/215.5 |
| 2004/0069186 | A1 | 4/2004 | Zacarias et al. |
| 2008/0075647 | A1 * | 3/2008 | Cochran ................ 423/243.06 |

FOREIGN PATENT DOCUMENTS

| | | |
|---|---|---|
| DE | 26 11 213 A | 3/1976 |
| DE | 35 26 756 A1 | 7/1985 |
| DE | 38 02 844 A1 | 11/1987 |
| EP | 0 227 196 B1 | 1/1987 |
| JP | 57053224 A | 3/1982 |
| JP | 59059237 A | 4/1984 |
| SU | 734162 | 5/1978 |

OTHER PUBLICATIONS

Cheminfo: Ammonia Gas, Chemical Profiles Created by CCOHS, Canadian Centre for Occupational Health and Safety, www.worksafesask.ca/files/ccohs/cheminfo/cie48.html, printed Mar. 10, 2006.

Vincent M. Giampa, Ammonia Removal from Coal Fly Ash by Carbon Burn-Out, NETL Conference Proceedings, 2001, Pittsburg, PA, www.progressfuels.com/cbo/AmmoniaRemoval.html, printed Jun. 2, 2005.

W.Braker et al., Matheson Gas Products, Matheson Gas Data Book 6th Edition, 1980, pp. 23-29.

Compressed Gas Association, Handbook of Compressed Gases 3Rd Edition, 1990, pp. 231-252, Van Nostrand Reinhold Co.

T.A. Czuppon et al., Ammonia, Kirk-Othmer Encyclopedia of Chemical Technology 4th Edition, 1992, pp. 678-710, vol. 2, John Wiley & Sons.

Kevin P. Resnik et al., Aqua Ammonia for Simultaneous Removal of $CO_2$, $SO_2$, And NO., Department of Energy, National Energy Technology Laboratory, Published: International Journal of Environmental Technology and Management, 2004, vol. 4 Nos. 1/2.

Frequently Asked Questions: American Coal Ash Association, website: www.acaa-usa.org/FAQ.htm, printed Jun. 1, 2005.

Ammonia, Environmental and Technical Information for Problem Spills, Jul. 1984, pp. 1-14, Technical Services Branch, Environmental Protection Service, Ottawa, ON, Canada.

Answer 296 of 406 of Chem Abstracts on STN, DE 3802884 (Hilgraf) Aug. 10, 1989 (abstract only).

Answer 327 of 406 of Chem Abstracts on STN, DE 3526756 (Ruetten et al.) Jan. 28, 1997 (abstract only).

"Treatment of Mercury in Fly Ash by the CBO Process," by Joe Cochran and Vincent Giampa, Research Disclosure Journal, June of 2003.

ASTM C618-05 "Standard Specification for Coal Fly Ash and Raw or Calcined Natural Pozzalan for Use in Concrete" (2005).

Giampa, "Ammonia Removal from Coal Fly Ash by Carbon Burn-Out," Conference on Selective Catalytic Reduction (SCR) and Selective Non-Catalytic Reduction (SNCR) for NOx Control, National Energy Technology Laboratory, Department of Energy, St. Petersburg, FL (2001).

Giampa, "Ammonia Removal from Coal Fly Ash by Carbon Burn-Out," NETL Conference Proceedings, Pittsburg, PA, www.progressfuels.com/cbo/AmmoniaRemoval.html, (printed Jun. 2, 2005).

Chinese Office Action mailed Sep. 19, 2008 for Chinese Patent Application No. 200610059156.2.

www.cheneylime.com/chemist.htm, dated Feb. 3, 2009.

* cited by examiner

FLY ASH BENEFICIATION SYSTEMS WITH SULFUR REMOVAL AND METHODS THEREOF

FIELD OF THE INVENTION

This invention generally relates to systems and methods for processing fly ash particles and, more particularly, to a systems for beneficiation of fly ash particles which at least partially reduce sulfur emissions and methods thereof.

BACKGROUND

Fly ash particles are a byproduct of coal fired power plants. These particles constitute about 10% of the total weight of the coal burned and, if not beneficially used, can be a substantial disposal problem.

The largest volume and highest value use of fly ash particles is as an admixture in Portland cement concrete. For use in concrete, the fly ash particles must meet stringent chemical and physical specifications, such as ASTM C-618. Often, the fly ash particles have a carbon content which precludes this beneficial use of the fly ash particles. As a result, these high carbon content fly ash particles must be disposed of at certain designated sites.

To utilize these fly ash particles, methods and apparatuses which use combustion processes to beneficiate fly ash particles by reducing the carbon content have been developed, such as those disclosed in U.S. Pat. Nos. 5,160,539 and 5,399,194, which are each herein incorporated by reference in their entirety. The beneficiated fly ash particles can be used to replace a portion of the cement in concrete, instead of requiring disposal in landfills.

Unfortunately, when the fly ash is beneficiated, gaseous compounds formed from sulfur in the fly ash are emitted into the environment in the exhaust gases. As environmental emission standards continue to be raised, new techniques for controlling sulfur emissions are required.

The basic chemical reactions that allow use of limestone ($CaCO_3$) to capture gaseous sulfur compounds resulting from combustion processes are well known. For example, limestone mixed with water is sprayed into boiler exhaust gases to capture sulfur in many power plants in devices known as Flue Gas Desulfurization units (FGD) or more simply as wet scrubbers. However, these FGD units require the benefits to reaction kinetics of wet chemistry (i.e.—much of the reaction occurs in the liquid phase) to allow economic and efficient sulfur capture at gas inlet temperatures of about 300° F.

Another example is the use of limestone beds in fluid bed combustors to capture sulfur compounds that result from burning fuels, such as coal and petroleum coke. However, these combustors require the bed be primarily composed of limestone with the fuel being only a small fraction of total bed mass. More importantly, they require high temperatures, i.e. above about 1375° F., to optimize the sulfur capture reaction.

Graphs and tables of examples of sulfur capture v. temperature at 2.0, 2.5, and 3.5×stoichiometric ratio are shown in FIGS. 1A-1C. The data used to plot these graphs was obtained from, "Combustion: Fossil Power Systems," published by Combustion Engineering, Inc., $3^{rd}$ Edition, 1981, Page 24-23 which is herein incorporated by reference in its entirety. These graphs indicate that the optimum sulfur capture temperature for fluid bed combustors with limestone beds is at about 1550° F. The graphs also show that the optimum temperature is essentially unchanged by increasing the concentration of limestone. Limestone concentration is expressed as the molar ratio of calcium (Ca) to sulfur (S). This ratio represents the multiple of excess Ca used to ensure a high rate of sulfur capture. The graphs cover Ca/S molar ratios of 2.0, 2.5, and 3.5 which is a typical range for fluid bed combustors and show that overall sulfur capture rises with molar ratio, but that the optimum temperature remains essentially constant.

Further, the graphs show that sulfur capture efficiency falls off rapidly as temperature either increases or decreases from the optimum. This can be seen from tables in FIG. 1A-1C (data points taken from the Combustion Engineering reference noted above) which list temperatures and percentages of sulfur capture in fluid beds. The graphs in FIG. 1A-1C were derived using curve fitting techniques to extrapolate the temperature range of these data points. The extrapolation indicates that very little or no sulfur capture would be expected below about 1375° F. for a molar ratio of 2.0 as shown in FIG. 1A. Even at a molar ratio of 3.5, a similar analysis shows little or no sulfur capture would be expected below about 1300° F. as shown in FIG. 1C.

SUMMARY

A system for beneficiation of fly ash particles which at least partially reduces sulfur emissions in accordance with embodiments of the present invention includes at least one mixing reactor with a chamber and at least one exhaust, at least one fly ash source connected to provide fly ash particles to the chamber, at least one sorbent source, and at least one fluid supply system. The sorbent source provides at least one type of sorbent particles to be mixed with the fly ash particles to reduce sulfur emissions. A mass of the fly ash particles in the chamber is greater than a mass of the sorbent particles in the chamber. The fluid supply system provides at least one fluid to the chamber during a beneficiation of at least a portion of the fly ash particles in the chamber.

A method for making a system for beneficiation of fly ash particles which at least partially reduces sulfur emissions in accordance with embodiments of the present invention includes providing at least one mixing reactor with a chamber and at least one exhaust. At least one fly ash source is connected to the chamber that supplies fly ash particles. At least one sorbent source supplies at least one type of sorbent particles to be mixed with the fly ash particles to reduce sulfur emissions. A mass of the fly ash particles in the chamber is greater than a mass of the sorbent particles in the chamber. At least one fluid supply system is connected to the chamber and provides at least one fluid during a beneficiation of at least a portion of the fly ash particles.

A method for beneficiation of fly ash particles which at least partially reduces sulfur emissions in accordance with embodiments of the present invention includes beneficiating fly ash particles which results in an exhausting one or more gases and adding at least one type of sorbent particles to the fly ash particles. At least a portion of the sorbent particles interact with at least a portion of the fly ash particles and exhaust gases to at least partially reduce sulfur emissions in the one or more exhausted gases. A mass of the fly ash particles during the beneficiating is greater than a mass of the sorbent particles.

The present invention provides a number of advantages including providing an effective system and method for beneficiation of fly ash particles which at least partially reduces sulfur emissions. More specifically, the present invention is able to reduce sulfur emissions during the beneficiation of fly ash particles at temperatures at or below 1375° F., in temperature ranges optimal for fly ash beneficiation, at efficiencies far higher than previously believed possible. One factor which enables sulfur reduction at this lower temperature range is the use of limestone particles having a range of sizes which are substantially the same size or smaller than a range of sizes for the fly ash particles. Additionally, through the use of pulverized limestone the present invention increases the quantity of the beneficiated ash product. Further, the present invention does not harm the resulting commercial quality of the beneficiated ash product because the small mass of pulverized limestone does not cause the beneficiated fly ash product to exceed the chemical limitations of specifications, such as ASTM C-618.

DETAILED DESCRIPTION

Figure 1A:
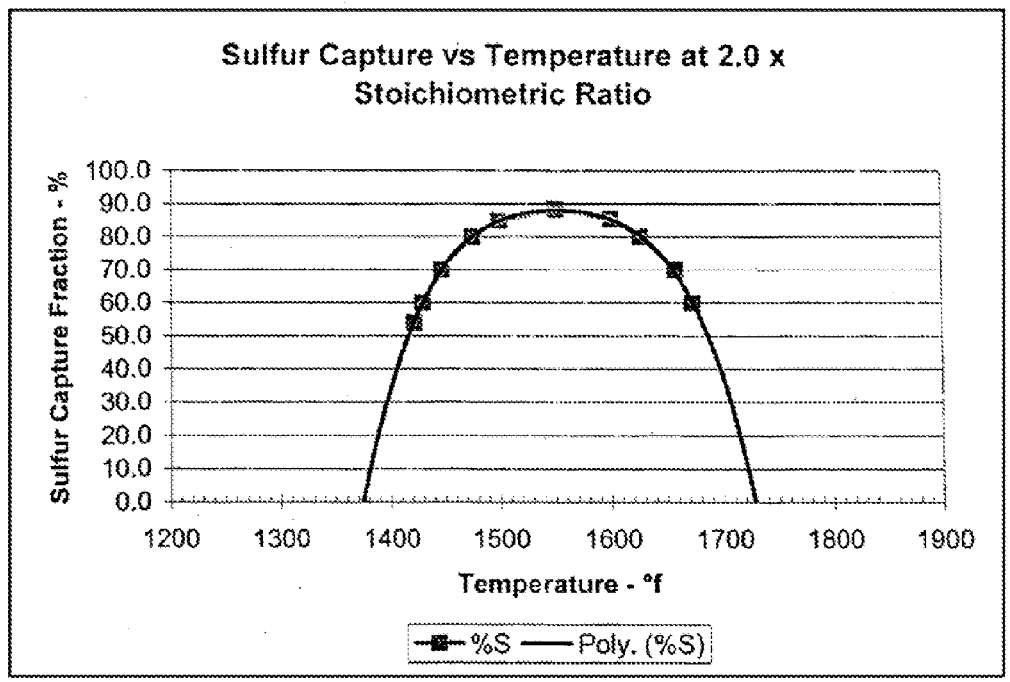
FIG. 1A is a graph and a table of sulfur capture v. temperature at 2.0×stoichiometric ratio.
Figure 1B:
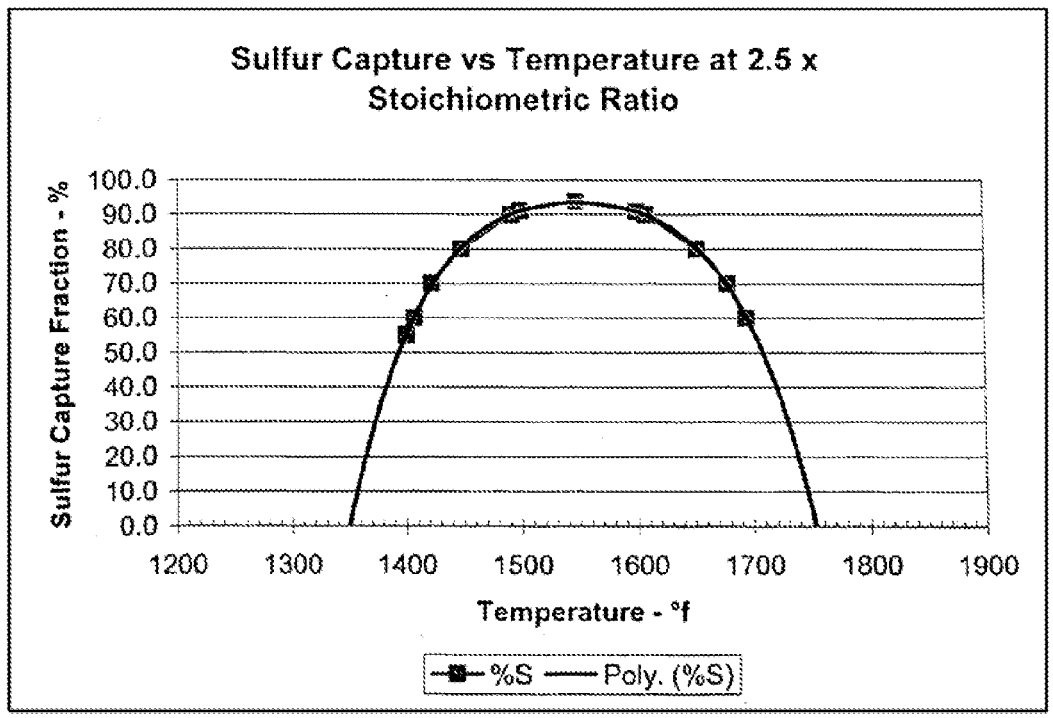
FIG. 1B is a graph and a table of sulfur capture v. temperature at 2.5× stoichiometric ratio.
Figure 1C:
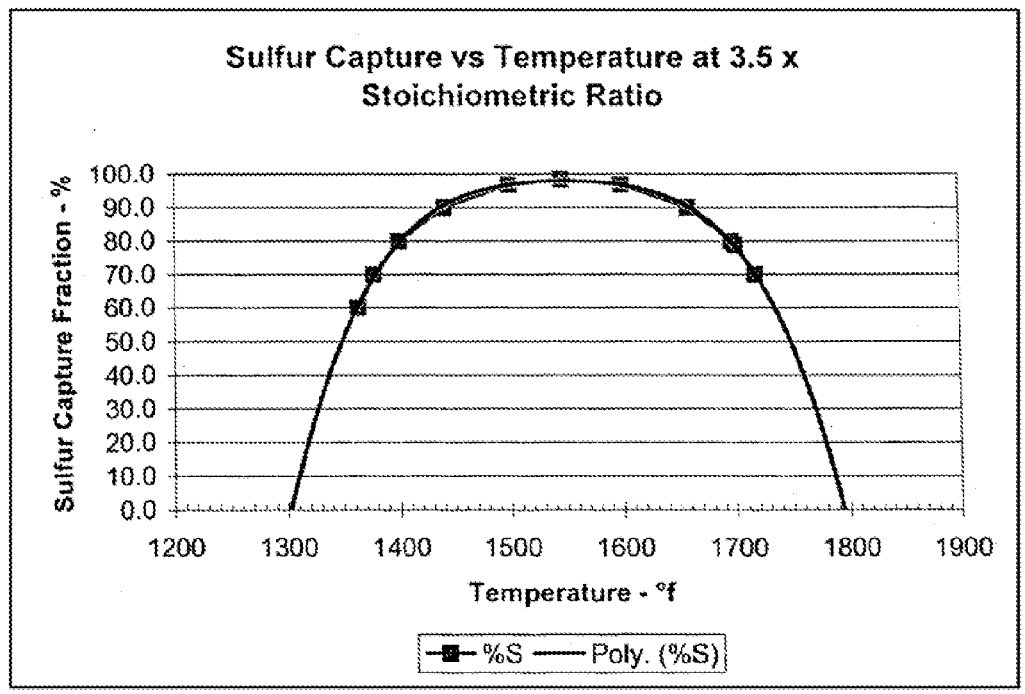
FIG. 1C is a graph and a table of sulfur capture v. temperature at 3.5× stoichiometric ratio.
Figure 2:
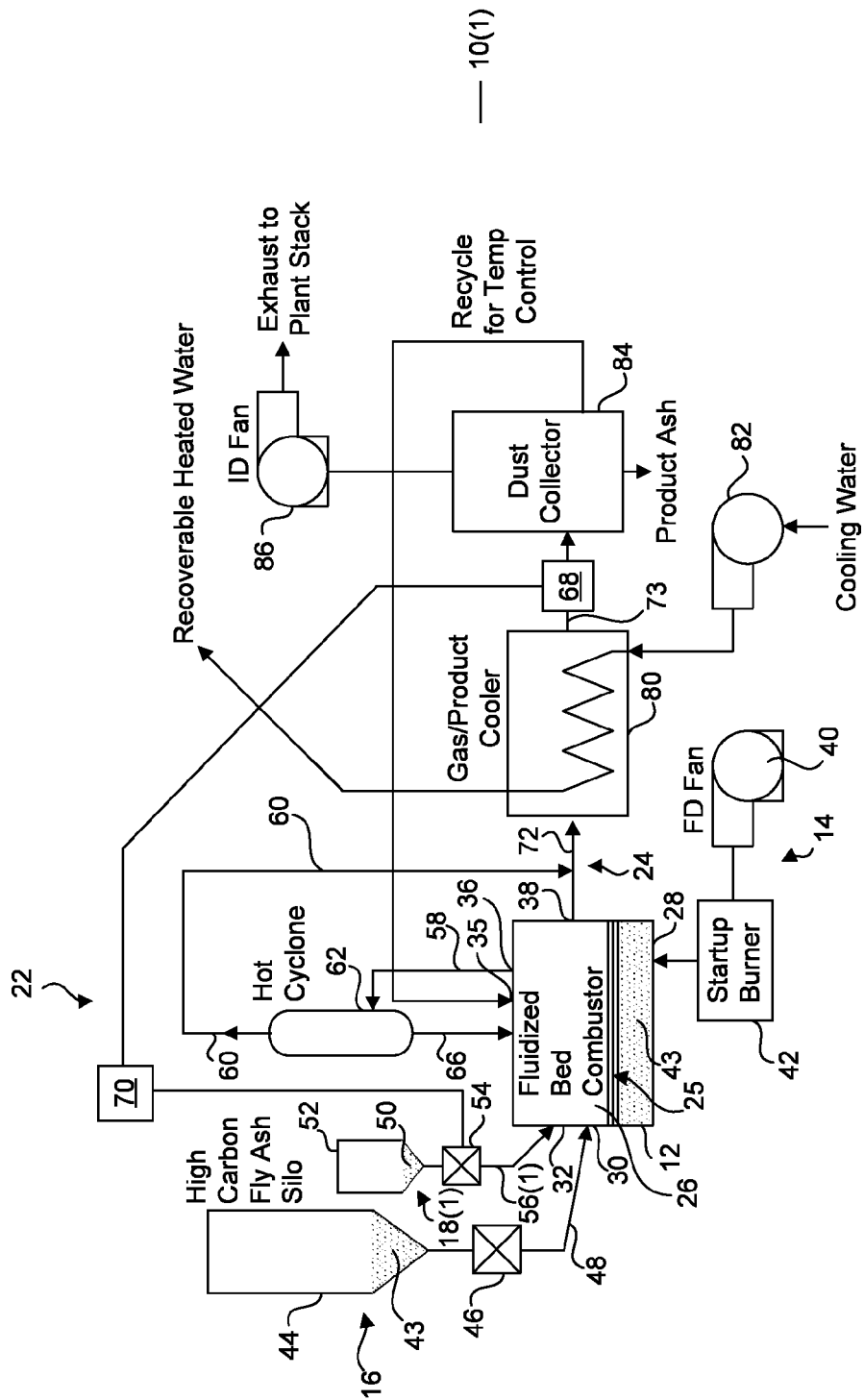
FIG. 2 is a block diagram of a fly ash beneficiation system which at least partially reduces sulfur emissions in accordance embodiments of the present invention.

A fly ash beneficiation system 10(1) which at least partially reduces sulfur emissions in accordance with embodiments of the present invention is illustrated in FIG. 2. The fly ash beneficiation system 10(1) includes a fluid bed reactor 12, a fluid supply system 14, a fly ash injection system 16, a pulverized sorbent injection system 18(1), an exhaust system 20, an optional feedback control system 22, and an outflow system 24, although the fly ash beneficiation system 10(1) can comprise other numbers and types of components in other configurations, such as those shown in FIGS. 3 and 4. The present invention provides an effective system and method for beneficiation of fly ash particles which at least partially reduces sulfur emissions.

Referring more specifically to FIG. 2, the fluid bed reactor 12 is a dry bubbling fluid bed which is used in the beneficiation of fly ash particles 43 and also for the reduction in sulfur emissions, although other types and numbers of well mixed reactors can be used. The fluid bed reactor 12 includes a chamber 26 inlets 28, 30, 32, 34, and 35, and outlets 36 and 38, although the chamber 26 can have other numbers and types of inlets and outlets and also other numbers of internal compartments.

The fluid supply system 14 provides air which may be heated during process startup or as otherwise needed to the chamber 26 of the reactor 12 to fluidize the fly ash particles 43 and sorbent particles 50 in the chamber 26 and create a fluid bed 25, although the fluid supply system 14 can provide other types of fluids which may or may not be heated to the chamber 26. In these particular embodiments, the temperature of the fluid bed 25 is controlled by one of several known means to about 1375° F. or below, although the fluid bed can be operated at other temperatures, such as a fluid bed 25 temperature of about 1550° F. or below. The fluid supply system 14 includes a forced draft fan 40 and an air pre-heater 42, although the fluid supply system 14 can comprise other numbers and types of components in other configurations and other types of fluid supply systems can be used. An outlet of the forced draft fan 40 is connected to an inlet of the air pre-heater 42 and an outlet of the air pre-heater 42 is connected to the inlet 28 of the reactor 12, although other configurations can be used.

The fly ash injection system 16 provides and regulates the flow of the fly ash particles 43 to the chamber 26 in the reactor 12, although other configurations for supplying the fly ash particles 43 can be used. The fly ash particles 43 have an average size range between about 0.01 mm and 0.025 mm with no more than about 32% of the particle mass retained on a 0.045 mm wet sieve to be suitable for further commercial use, although the size range of the fly ash particles 43 can vary. In this example, the fly ash particles 43 have an average diameter of about 0.02 mm, although the fly ash particles 43 can have other dimensions.

The fly ash injection system 16 includes a bin 44, a feeder valve 46, and a feed line 48, although the fly ash injection system 16 can comprise other numbers and types of components in other configurations, such as multiples bins which each supply fly ash particles 43 to the chamber 26. The feeder valve 46 is located in and controls the rate at which fly ash particles 43 are supplied in the feed line 48 which is connected between the bin 44 and the inlet 30 to the chamber 26, although other configurations can be used.

The sorbent injection system 18(1) provides and regulates the flow of sorbent particles 50 to the chamber 26 in the reactor 12 which are used to reduce sulfur emissions, although other configurations for supplying the sorbent particles can be used. In these embodiments, the sorbent particles 50 comprise pulverized calcium carbonate (limestone), although other types of sorbents can be used, such as magnesium carbonate, dolomite, and oxides such as oxide of calcium and/or oxide of magnesium. One of the advantages of using pulverized limestone for the sorbent particles 50 is that it is relatively inexpensive and typically has the least concerns relating to fly ash product quality. The sorbent particles 50 have a range of sizes which are substantially the same size or smaller than a range of sizes for the fly ash particles 43. In this particular embodiment, the sorbent particles 50 have an average size range between about 0.010 mm and 0.020 mm, although the size range of the sorbent particles 50 can vary. In this example, the sorbent particles 50 have an average diameter of about 0.02 mm, although the sorbent particles 50 each can have other dimensions.

With substantially the same range of sizes for the sorbent particles 50 and the fly ash particles 43, the fluid bed reactor 12 is able to operate as if only fly ash particles 43 were present in the fluid bed reactor 12. As a result, the sorbent particles 50 in this similar size range do not interfere with the fly ash beneficiation process. Additionally, the small size of the sorbent particles 50 provides a greater surface area to interact with the fly ash particles 43 to interact with any released sulfur to reduce sulfur emissions. Further, by using sorbent particles 50 with substantially the same range of sizes as the fly ash particles 43, the beneficiated fly ash product can be kept below a maximum allowed size for commercial purposes. Typically, the maximum allowed size for beneficiated fly ash is based on ASTM C-618 which requires no more than 32% of the particle mass retained on a 0.045 mm wet sieve, although this maximum size can vary based on the particular application. Further, with the present invention more of the fluid bed reactor 12 is filled with fly ash particles 43 than with sorbent particles 50.

The sorbent injection system 18(1) includes a bin 52, a feeder valve 54, and a feed line 56(1), although the sorbent injection system 18(1) can comprise other numbers and types of components in other configurations, such as multiples bins which each supply sorbent particles 50 to the chamber 26. In the sorbent injection system 18(1), the feeder valve 54 is located in and controls the rate at which sorbent particles 50 are supplied in the feed line 56(1). The feed line 56(1) is connected between the bin 52 and inlet 32 to the chamber 26, although other configurations and manners for regulating the flow of the sorbent particles 50 can be used. For example, the sorbent particles 50 could be mixed with the fly ash particles 43 in another reactor or reactors before the beneficiation process in the chamber 26.

The circulation system 20 exhausts one or more gases and fly ash particles 43 from the outlet 36 in the chamber 26, collects fly ash particles 43 in the exhaust gas or gases, and gravity feeds the collected fly ash particles 43 back to the chamber 26, although other configurations for the circulation system 20 can be used. The exhaust system 20 includes exhaust lines 58 and 60, dust collector 62, such as a cyclone, bag house, electrostatic precipitator or other dust collection device, and a return line 66, although the circulation system 20 can comprise other numbers and types of components in other configurations. The exhaust line 58 is connected between the outlet 36 and an inlet to the dust collector 62. The return line 66 is connected between the dust collector 62 and inlet 34 to the chamber 26, although other configurations and manners for capturing and reintroducing fly ash particles 43 can be used. The other exhaust line 60 exhausts emissions of the gas or gases resulting from the beneficiation of the fly ash particles 43 to the exhaust line 72.

The feedback control system 22 measures the amount of sulfur emissions in the gas or gases exhausted in the exhaust line 73. Based on this measurement, the feedback control system 22 controls the mass of the sorbent particles 50 supplied by the sorbent injection system 18(1) to be mixed with the fly ash particles 43. Although a feedback control system 22 is shown, the feedback control system 22 is optional and is not required. Additionally, other types of closed and open loop feedback systems could be used, such as an open loop control system that sets a ratio between the feed of fly ash particles 43 and feed of pulverized sorbent particles 50.

The feedback control system 22 includes a sulfur emission monitoring device 68 and a feedback processing system 70, although feedback control system 22 can comprise other numbers and types of components in other configurations. The sulfur emission monitoring device 68 is connected to the exhaust line 73 to measure the amount of sulfur and transmits the measurement to the feedback processing system 70. The feedback processing system 70 is coupled to the feeder valve 54 and the sulfur emission monitoring device 68 and adjusts the mass of sorbent particles 50 the feeder valve 54 supplies to the chamber 26 via feed line 56(1) in response to the measured amount of sulfur emissions, although other configurations can be used.

The feedback processing system 70 comprises a central processing unit (CPU) or processor and a memory which are coupled together by a bus or other link, although other numbers and types of components in other configurations and other types of control systems could be used. The processor executes a program of stored instructions for one or more aspects of the present invention including the method for controlling an amount of a mass of the sorbent particles 50 to be mixed with the fly ash particles 43 in response to the measured amount of sulfur emissions as described and illustrated herein. The memory stores these programmed instructions for execution by the processor. A variety of different types of memory storage devices, such as a random access memory (RAM) or a read only memory (ROM) in the system or a floppy disk, hard disk, CD ROM, or other computer readable medium which is read from and/or written to by a magnetic, optical, or other reading and/or writing system that is coupled to the processor, can be used for the memory to store these programmed instructions.

The outflow system 24 outputs the beneficiated fly ash particles which are now suitable for other applications, such as a replacement for a portion of the cement in concrete. The outflow system 24 includes an outflow line 72 which is connected to the outlet 38 and to the exhaust line 60, a gas/product cooler system 80, a cooling water supply 82, a dust collector system 84, and an induced draft (ID) fan system 86, although outflow system 24 can comprise other numbers and types of components in other configurations. The beneficiated fly ash particles and gases are supplied by the exhaust line 72 to the gas/product cooler system 80. The gas/product cooler system 80 receives a supply of cooling water from water supply 82 which is used to cool the beneficiated fly ash particles and gases, although other fluids and/or cooling systems could be used. The cooled beneficiated fly ash particles and gases are output from the cooler system 80 to the dust collector system 84 which separates and outputs the beneficiated fly ash particles and exhausts the gases with the assistance of the ID fan system 86. A portion of the beneficiated fly ash particles are fed back to the chamber 26 via inlet 35 to help control and regulate the temperature in the fluid bed 25. In these embodiments, the temperature in the fluid bed 25 in the chamber 26 is at or below about 1375° F., although the fluid bed 25 in the chamber 26 can be operated at other temperatures.

Figure 3:
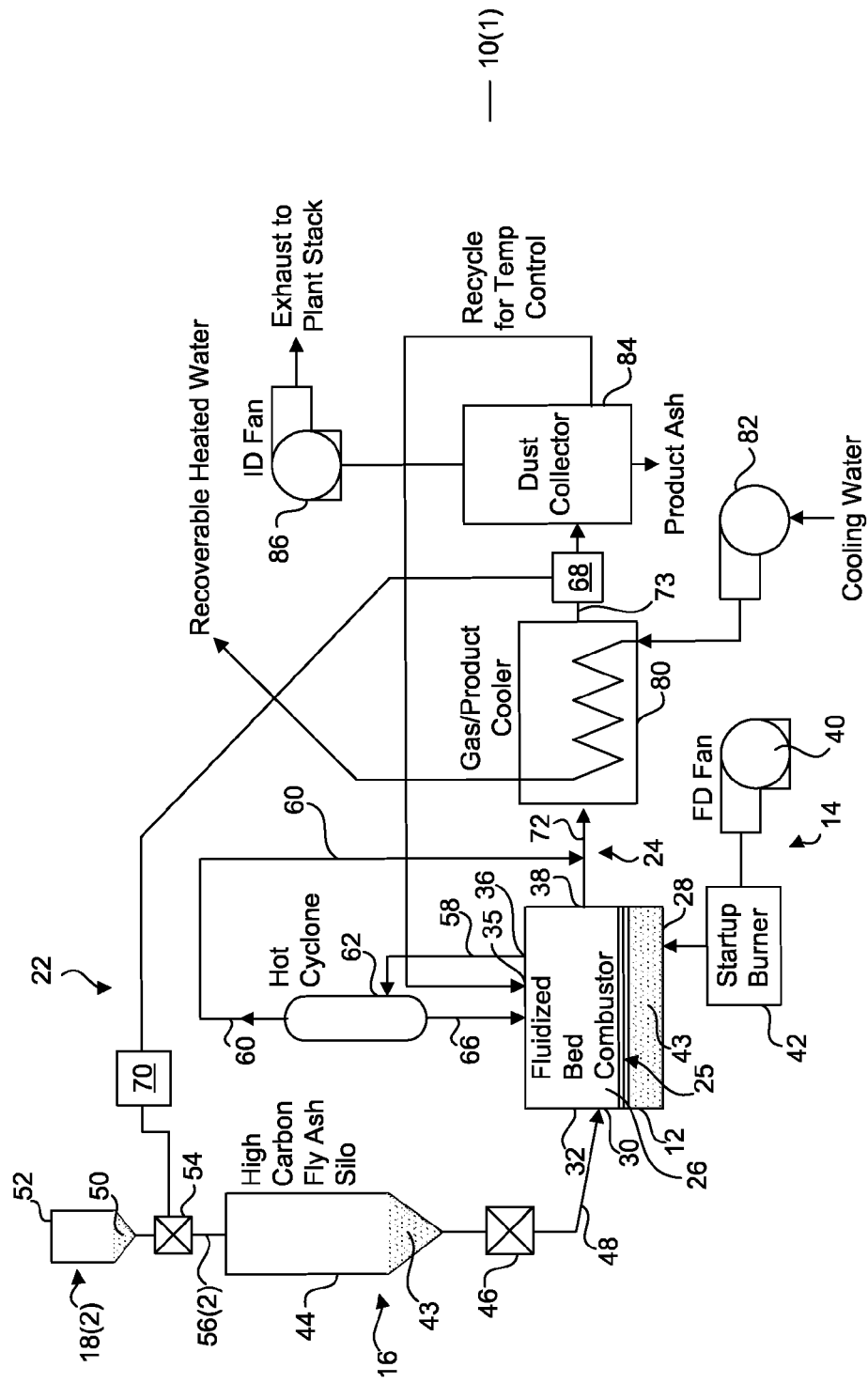
FIG. 3 is a block diagram of another fly ash beneficiation system which at least partially reduces sulfur emissions in accordance other embodiments of the present invention.

The fly ash beneficiation system 10(2) shown in FIG. 3 is identical to the fly ash beneficiation system 10(1) shown in FIG. 2, except as described herein. Elements in FIG. 3 which are like those shown in FIG. 2 will have like reference numerals. In this embodiment, the sorbent injection system 18(2) includes a bin 52, a feeder valve 54, and a feed line 56(2), although the sorbent injection system 18(2) can comprise other numbers and types of components in other configurations, such as multiples bins which each supply sorbent particles 50 and other types of metering systems. The feeder valve 54 is located in the feed line 56(2) and controls the rate at which sorbent particles 50 are supplied via the feed line 56(2) to the bin 44 of the fly ash injection system 16, although other configurations can be used.

Figure 4:
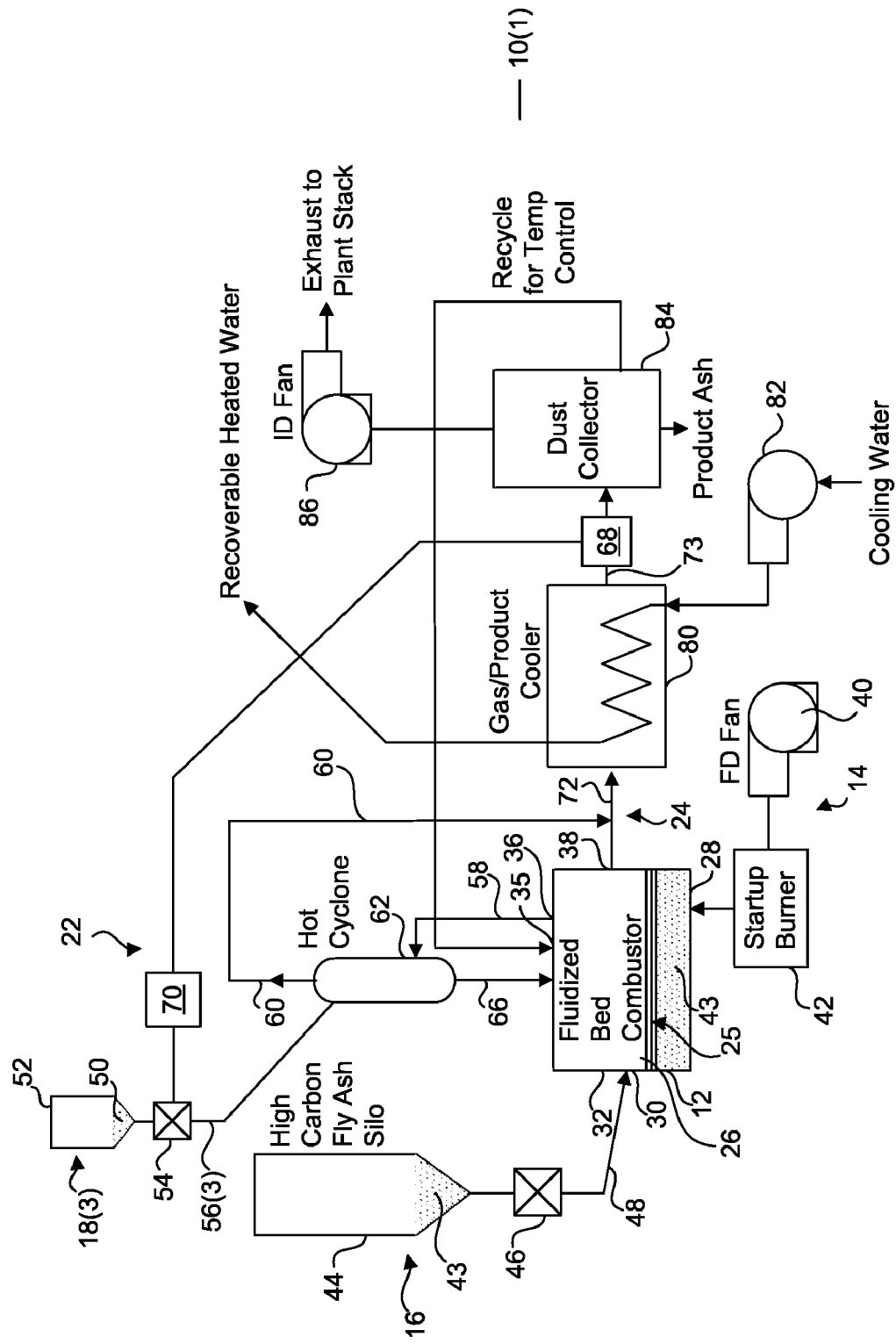
FIG. 4 is a block diagram of yet another fly ash beneficiation system which at least partially reduces sulfur emissions in accordance other embodiments of the present invention.

The fly ash beneficiation system 10(3) shown in FIG. 4 is identical to the fly ash beneficiation system 10(1) shown in FIG. 2, except as described herein. Elements in FIG. 4 which are like those shown in FIG. 2 will have like reference numerals. In this embodiment, the sorbent injection system 18(3) includes a bin 52, a feeder valve 54, and a feed line 56(3), although the sorbent injection system 18(3) can comprise other numbers and types of components in other configurations, such as multiples bins which each supply sorbent particles 50 and other types of metering systems. The feeder valve 54 is located in the feed line 56(3) and controls the rate at which sorbent particles 50 are supplied via feed line 56(3) to the circulation system 20, although other configurations and locations for injecting the sorbent particles 50 can be used.

The operation of the fly ash beneficiation system 10(1) will now be described with reference to FIG. 2. Fly ash particles 43 are introduced from the bin 44 via feed line 48 into the chamber 26 of the fluid bed reactor 12 via inlet 30. The rate at which the fly ash particles 43 are supplied is controlled by feeder valve 46, although other manners for supplying and metering the flow of the fly ash particles 43 into the chamber 26 can be used.

Additionally, to reduce sulfur emissions, sorbent particles 50, such as calcium carbonate (limestone), magnesium carbonate, dolomite, and oxides such as oxide of calcium and/or oxide of magnesium are introduced from the bin 52 via feed line 56(1) into the chamber 26 of the fluid bed reactor 12. The rate at which the sorbent particles 50 are supplied is metered by feeder valve 54 and controlled by feedback control system 22, although other manners for supplying, metering and controlling the flow of the sorbent particles 50 into the chamber 26 can be used. With the present invention, a larger mass of fly ash particles 43 than sorbent particles 50 is deposited in the fluid bed reactor 12.

Air is drawn in by fan 40 and may be heated by pre-heater 42 to the desired temperatures for start-up or as otherwise desired, although pre-heating is not required during operation and other types of fluids could be used. The air is the fly ash particles 43 and the sorbent particles 50 in the chamber 26. Fan 40 supplies the air into chamber 26 at a superficial velocity (the actual upward air velocity at the fluid bed operating temperature and pressure if no fly ash particles 43 were present) of at least about 0.5 feet per second, but less than 3.0 feet per second. Since the sorbent particles 50 and the fly ash particles 43 have substantially the same size, the fluid bed reactor 12 operates in the same manner as if only fly ash particles 43 were present in the fluid bed reactor 12. Thus, with the present invention the sorbent particles 50 do not interfere with the fly ash beneficiation process. Additionally, the small size of the sorbent particles 50 also provides a greater surface area to interact with the fly ash particles 43 to reduce sulfur emissions.

As the fly ash particles 43 and the sorbent particles 50 travel through fluid bed 25 in chamber 26, they intimately mix with the air being forced up through the inlet 28. Oxygen within the air chemically reacts with the fly ash particles 43 to oxidize a portion of the carbon therein and thereby reduce the carbon content of the fly ash particles 43. Oxygen within the air also chemically reacts with the fly ash particles 43 to oxidize a portion of the sulfur therein. Oxidation of both carbon and sulfur produces heat. Additionally, the sorbent particles 50 interact with the sulfur oxides released during the oxidation of the sulfur in the fly ash particles 43 to create a byproduct, such as calcium sulfate anhydrite (CaSO4) and to thereby reduce sulfur emissions in any exhaust gases. The chamber 26 is sized and the level of fluid bed 25 is controlled so that the fly ash particles 43 have a residence time in the fluid bed 25 of at least two minutes, although the residence can vary based on the particular application.

The hot gases and some of the fly ash particles 43 rise within chamber 26 and circulate out through the outlet 36 into exhaust line 58 and up to the dust collector 62. The dust collector 62 separates any fly ash particles 43, which are typically of a dust-like character, from the exhausted gas or gases. The fly ash particles 43 collected in the dust collector 62 are gravity fed back to the chamber 26 via return line 66 into inlet 34 of chamber 26. The rate at which the collected fly ash particles 43 from dust collector 62 reenter chamber 26 can be metered. The exhaust gas or gases pass out of the dust collector 62 into another exhaust line 60 which is coupled to the exhaust line 72 to mix with the beneficiated fly ash particles being expelled at outlet 38.

The sulfur emission monitoring device 68 which is connected to the exhaust line 73 measures the amount of sulfur emissions in the exhaust gas or gases and transmits the measurements to the feedback processing system 70. Based on the measured amount of sulfur emissions, the feedback processing system 70 determines if any adjustments to the mass of sorbent particles 50 being supplied chamber 26 needs to be made. If an adjustment needs to be made, the feedback processing system 70 controls the feeder valve 56 to adjust the rate at which sorbent particles 50 are supplied to the chamber 26, although other manners for controlling the rate of supplying sorbent particles 50 can be used.

Again, although a feedback control system 22 is shown, the feedback control system 22 is optional and is not required. Additionally, other types of closed and open loop feedback systems could be used, such as an open loop control system that sets a ratio between the feed of fly ash particle 43 and feed of pulverized sorbent particles 50.

The beneficiated fly ash particles and resulting byproduct from the interaction of the sorbent particles 50 with sulfur exit fluid bed 25 in chamber 26 through outlet 38 into exhaust line 72. The beneficiated fly ash particles and gases are cooled by the gas/product cooler system 80 which receives cooling water from cooling water system 82. The beneficiated fly ash particles and gases are supplied by the exhaust line 72 to the gas/product cooler system 80. The gas/product cooler system 80 receives a supply of cooling water from water supply 82 and cools the beneficiated fly ash particles and gases, although other fluids and/or cooling systems could be used. The cooled beneficiated fly ash particles and gases are output from the cooler system 80 to the dust collector system 84 which separates and outputs the beneficiated fly ash particles and exhausts the gases with the assistance of the ID fan system 86. A portion of the beneficiated fly ash particles are fed back to the chamber 26 via inlet 35 to help control and regulate the temperature in the fluid bed 25. In these embodiments, the temperature in the fluid bed 25 in the chamber 26 is at or below about 1375° F., although the fluid bed 25 in the chamber 26 can be operated at other temperatures.

The product fly ash beneficiated by the present invention has a sufficiently low carbon content to permit it to be used, without further processing, as a replacement for a portion of the cement in concrete or for other applications, such as mineral filler or as an addition to concrete to give the concrete better properties. In these embodiments, the beneficiated product fly ash has a carbon content of less than approximately 6% and often less than 2%, although the percentage of carbon content in the beneficiated product fly ash can vary.

The operation of the fly ash beneficiation system 10(2) shown in FIG. 3 is identical to the operation of the fly ash beneficiation system 10(1) shown in FIG. 2, except as described herein. In this embodiment, the feed line 56(2) from the bin 52 of sorbent particles 50 is connected to the bin 44 of the fly ash injection system 16, although other configurations can be used. As a result, the sorbent particles 50 are added to and can be mixed with the fly ash particles 43 before being introduced into the chamber 26.

The operation of the fly ash beneficiation system 10(3) shown in FIG. 4 is identical to the operation of the fly ash beneficiation system 10(1) shown in FIG. 2, except as described herein. In this embodiment the feed line 56(3) from the bin 52 of sorbent particles 50 is connected to and introduces the sorbent particles 50 to the dust collector 62 of the circulation system 20, although other configurations and locations for injecting the sorbent particles 50 can be used. As a result, the sorbent particles 50 are introduced into the chamber 26 via the circulation system 20.

Accordingly, the present invention provides an effective system and method for beneficiation of fly ash particles which at least partially reduces sulfur emissions. Additionally, the present invention is able to reduce sulfur emissions during the beneficiation of fly ash particles at temperatures at or below 1375° F. One factor which enables sulfur reduction at this lower temperature range is the use of limestone particles having a range of sizes which are substantially the same size or smaller than a range of sizes for the fly ash particles. Further, the present invention increases the quantity of the beneficiated ash product. Finally, because the small mass of pulverized limestone does not cause the beneficiated fly ash product to exceed the chemical limitations of specifications such as ASTM C-618, the present invention does not harm the resulting commercial quality of the beneficiated ash product.

EXAMPLES

Fly ash weighing 35 lb was added to a small, batch type fluid bed fly ash processing unit as described in U.S. Pat. No. 5,160,539 to Cochran. Pulverized limestone was added at a molar ratio of 2:1. The unit was heated to autoignition (at about 900° F.), the external heat was removed, the bed temperature was allowed to rise to 1300° F. and the carbon combustion was allowed to proceed to completion. The carbon in the fly ash was reduced from 13.3% to 0.3%. Note that oxidation of both carbon and sulfur occurs at a very low rate even at room temperature. Autoignition refers to the point at which the oxidation rate greatly increases (and can then be called combustion) and the process becomes self-sustaining without application of external heat. The total sulfur mass in the bed prior to processing was 0.0665 lb. When the bed temperature first reached 1300° F., the total sulfur mass was 0.0323 lb and the bed carbon content was 6.1%. As expected, a portion of the carbon was oxidized both during heat-up and after autoignition during the climb to the controlled bed temperature. Likewise, a substantial amount of the sulfur was already combusted and lost. This indicates that, as expected, sulfur capture rate did not rise as quickly as the sulfur oxidation rate at lower temperatures during the heat-up and rise after autoignition. However, after completing the run with the bed temperature controlled at 1300° F., bed carbon content was 0.3% and the total mass of sulfur in the bed was 0.0334 lb (essentially unchanged since reaching 1300° F. within the limits of measurement accuracy). Overall, 50.2% of the original sulfur was captured and retained in the bed during processing. However, during the period when the bed temperature was maintained at 1300° F., the capture rate was very near 100%. This implies a very high sulfur capture rate both at 1300° F. and a lower, but still substantial, capture rate during the climb from autoignition at 900° F. to 1300° F.

In another example, the same apparatus, fly ash and procedure was used with pulverized limestone from a different commercial source. Pulverized limestone was added at a molar ratio of 2:1. The unit was heated to autoignition (at about 900° F.), the external heat was removed, the bed temperature was allowed to rise to 1300° F. and the carbon combustion was allowed to proceed to completion. The carbon in the fly ash was reduced from 12.5% to 0.6%. The total sulfur mass in the bed prior to processing was 0.0665 lb. When the bed temperature first reached 1300° F., the total sulfur mass was 0.0430 lb and the bed carbon content was 7.5%. After completing the run with the bed temperature controlled at 1300° F., bed carbon content was 0.6% and the total mass of sulfur in the bed was 0.0431 lb (essentially unchanged since reaching 1300° F. within the limits of measurement accuracy). Overall, 64.8% of the original sulfur was captured and retained in the bed during processing. However, during the period when the bed temperature was maintained at 1300° F., the capture rate was very near 100%. This implies a very high sulfur capture rate both at 1300° F. and a lower, but still substantial, capture rate during the climb from autoignition at 900° F. to 1300° F.

In another example, the same apparatus and procedure was used with fly ash from a different power plant and pulverized limestone from a third commercial source. Pulverized limestone was added at a molar ratio of only 1:1. The unit was heated to autoignition (at about 1000° F.), the external heat was removed, the bed temperature was allowed to rise to 1300° F. and the carbon combustion was allowed to proceed to completion. The carbon in the fly ash was reduced from 11.7% to 0.5%. The total sulfur mass in the bed prior to processing was 0.0945 lb. When the bed temperature first reached 1300° F., the total sulfur mass was 0.0495 lb and the bed carbon content was 6.4%. After completing the run with the bed temperature controlled at 1300° F., bed carbon content was 0.5% and the total mass of sulfur in the bed was 0.0527 lb (essentially unchanged since reaching 1300° F. within the limits of measurement accuracy). Overall, 55.8% of the original sulfur was captured and retained in the bed during processing. However, during the period when the bed temperature was maintained at 1300° F., the capture rate was very near 100%. This implies a very high sulfur capture rate both at 1300° F. and a lower, but still substantial, capture rate during the climb from autoignition at 1000° F. to 1300° F.

In another example, the same apparatus and procedure was used with blend of fly ashes from three different power plants and a dolomitic limestone containing roughly equal parts of limestone ($CaCO_3$) and dolomite ($MgCO_3$— however, note dolomitic limestone is sometimes written $CaMg(CO_3)2$). The dolomitic limestone was added at a Ca+Mg/S molar ratio of only 1:1. The unit was heated to autoignition (at about 1000° F.), the external heat was removed, the bed temperature was allowed to rise to 1300° F. and the carbon combustion was allowed to proceed to completion. The carbon in the fly ash was reduced from 12.0% to 0.4%. The total sulfur mass in the bed prior to processing was 0.0772 lb. When the bed temperature first reached 1300° F., the total sulfur mass was 0.0351 lb and the bed carbon content was 6.9%. After completing the run with the bed temperature controlled at 1300° F., bed carbon content was 0.4% and the total mass of sulfur in the bed was 0.0378 lb (essentially unchanged since reaching 1300° F. within the limits of measurement accuracy). Overall, 49.0% of the original sulfur was captured and retained in the bed during processing. However, during the period when the bed temperature was maintained at 1300° F., the capture rate was very near 100%. This implies a very high sulfur capture rate both at 1300° F. and a lower, but still substantial, capture rate during the climb from autoignition at 1000° F. to 1300° F.

In a final example, a pilot scale continuous fluid bed fly ash processing unit as described in U.S. Pat. No. 5,160,539 to Cochran was used to process a stream of fly ash and limestone mixed to provide a molar ratio of approximately 1.04:1. The unit was brought to more-or-less steady state operation at 1300° F. bed temperature before limestone addition was initiated. During the measurement period of 85 minutes, fly ash containing 8.48% carbon and 0.69% sulfur was added at an average rate of 1242 lb/hr. Product ash containing 1.1% carbon and 0.65% sulfur was discharged from the unit during this time at a calculated rate of 1148 lb/hr (the discharge rate being less than the feed rate by the amount of carbon and sulfur combusted). This represents a sulfur capture rate (total sulfur in the product divided by total sulfur introduced in the feed) of 87.1%.

All of these examples used a bed temperature of 1300° F. which is a common temperature used in fly ash processing. Even with low molar ratios of between 1:1 and 2:1, they demonstrate unexpectedly high sulfur capture rates at that temperature. Additionally, the first four examples provide evidence that substantial sulfur capture is occurring even at lower temperatures.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A system for beneficiation of fly ash particles which at least partially reduces sulfur emissions, the system comprising:
   at least one mixing reactor with a chamber and at least one exhaust;
   at least one fly ash source connected to provide fly ash particles to the chamber;
   at least one sorbent source that provides at least one type of sorbent particles to be mixed with the fly ash particles to reduce sulfur emissions, wherein a mass of the fly ash particles in the chamber is greater than a mass of the sorbent particles in the chamber; and
   at least one fluid supply system which provides at least one fluid to the chamber during a beneficiation of at least a portion of the fly ash particles in the chamber.

2. The system as set forth in claim 1 wherein an operating temperature of a fluid bed of the fly ash particles with the sorbent particles in the chamber is at or below about 1375° F.

3. The system as set forth in claim 1 wherein sulfur emissions in the exhaust are reduced by at least about 50%.

4. The system as set forth in claim 3 wherein sulfur emissions in the exhaust are substantially eliminated.

5. The system as set forth in claim 1 wherein the sorbent particles comprise at least one of calcium carbonate, magnesium carbonate, an oxide of calcium and an oxide of magnesium.

6. The system as set forth in claim 1 wherein the sorbent particles have an average particle size which is substantially the same size or smaller than an average particle size for the fly ash particles.

7. The system as set forth in claim 6 wherein the sorbent particles have an average size range between about 0.010 mm and 0.020 mm.

8. The system as set forth in claim 1 wherein a ratio of a portion of the provided sorbent particles that reacts with sulfur to a mass of sulfur in the fly ash particles in the chamber of the mixing reactor is at least 1:1.

9. The system as set forth in claim 8 wherein the ratio of the portion of the provided sorbent particles that reacts with the sulfur to a mass of sulfur in the fly ash particles in the chamber of the reactor is at least 2:1.

10. The system as set forth in claim 1 wherein the at least one sorbent source provides the sorbent particles to be mixed with the fly ash particles in the chamber.

11. The system as set forth in claim 1 wherein the at least one sorbent source provides the sorbent particles to the at least one fly ash source to be mixed with the fly ash particles before being supplied into the chamber.

12. The system as set forth in claim 1 wherein the at least one sorbent source provides the sorbent particles to a circulation system before being supplied into the chamber.

13. The system as set forth in claim 1 further comprising a control system that controls an amount of a mass of the sorbent particles to be mixed with the fly ash particles.

14. The system as set forth in claim 1 wherein the fluid supply system further comprises:
   at least one heater which heats the at least one fluid at least during a startup period; and
   at least one fan which provides the at least one fluid to the at least one heater.

15. A method for making a system for beneficiation of fly ash particles which at least partially reduces sulfur emissions, the method comprising:
   providing at least one mixing reactor with a chamber and at least one exhaust;
   connecting at least one fly ash source to the chamber that supplies fly ash particles;
   providing at least one sorbent source that supplies at least one type of sorbent particles to be mixed with the fly ash particles to reduce sulfur emissions, wherein a mass of the fly ash particles in the chamber is greater than a mass of the sorbent particles in the chamber; and
   connecting at least one fluid supply system to the chamber, the fluid supply system provides at least one fluid during a beneficiation of at least a portion of the fly ash particles.

16. The method as set forth in claim 15 wherein an operating temperature of a fluid bed of the fly ash particles with the sorbent particles in the chamber is at or below about 1375° F.

17. The method as set forth in claim 15 wherein sulfur emissions in the exhaust are reduced by at least about 50%.

18. The method as set forth in claim 17 wherein sulfur emissions in the exhaust are substantially eliminated.

19. The method as set forth in claim 15 wherein the sorbent particles comprise at least one of calcium carbonate, magnesium carbonate, an oxide of calcium and an oxide of magnesium.

20. The method as set forth in claim 15 wherein the sorbent particles have an average particle size which is substantially the same size or smaller than an average particle size for the fly ash particles.

21. The method as set forth in claim 20 wherein the sorbent particles have an average size range between about 0.010 mm and 0.020 mm.

22. The method as set forth in claim 15 wherein a ratio of a portion of the provided sorbent particles that reacts with sulfur to a mass of sulfur in the fly ash particles in the chamber of the mixing reactor is at least 1:1.

23. The method as set forth in claim 22 wherein a ratio of the portion of the provided sorbent particles to a mass of sulfur in the fly ash particles in the chamber of the reactor is at least 2:1.

24. The method as set forth in claim 15 wherein the at least one sorbent source provides the sorbent particles to be mixed with the fly ash particles in the chamber.

25. The method as set forth in claim 15 wherein the at least one sorbent source provides the sorbent particles to the at least one fly ash source to be mixed with the fly ash particles before being supplied into the chamber.

26. The method as set forth in claim 15 wherein the at least one sorbent source provides the sorbent particles to a circulation system before being supplied into the chamber.

27. The method as set forth in claim 15 further comprising a control system that controls an amount of a mass of the sorbent particles to be mixed with the fly ash particles.

28. The method as set forth in claim 15 wherein the fluid supply system further comprises:
  at least one heater which heats the at least one fluid at least during a startup period; and
  at least one fan which provides the at least one fluid to the at least one heater.

29. A method for beneficiation of fly ash particles which at least partially reduces sulfur emissions, the method comprising:
  beneficiating fly ash particles which results in an exhausting one or more gases; and
  adding at least one type of sorbent particles to the fly ash particles, wherein at least a portion of the sorbent particles interact with at least a portion of the fly ash particles and exhaust gases to at least partially reduce sulfur emissions in the one or more exhausted gases, wherein a mass of the fly ash particles during the beneficiating is greater than a mass of the sorbent particles.

30. The method as set forth in claim 29 wherein an operating temperature of a fluid bed of the fly ash particles with the sorbent particles is at or below about 1375° F.

31. The method as set forth in claim 29 wherein sulfur emissions are reduced by at least about 50%.

32. The method as set forth in claim 31 wherein sulfur emissions are substantially eliminated.

33. The method as set forth in claim 29 wherein the sorbent particles comprise at least one of calcium carbonate, magnesium carbonate, an oxide of calcium and an oxide of magnesium.

34. The method as set forth in claim 29 wherein the sorbent particles have an average particle size which is substantially the same size or smaller than an average particle size for the fly ash particles.

35. The method as set forth in claim 34 wherein the sorbent particles have an average size range between about 0.010 mm and 0.020 mm.

36. The method as set forth in claim 29 wherein a ratio of a portion of the provided sorbent particles that reacts with sulfur to a mass of sulfur in the fly ash particles in the chamber of the mixing reactor is at least 1:1.

37. The method as set forth in claim 36 wherein a ratio of the portion of the provided sorbent particles that reacts with sulfur to a mass of sulfur in the fly ash particles is at least 2:1.

38. The method as set forth in claim 29 wherein the sorbent particles are mixed with the fly ash particles in a chamber of a mixing reactor.

39. The method as set forth in claim 29 wherein the sorbent particles are mixed with at least a portion of the fly ash particles in a circulation system before being supplied to a chamber of a mixing reactor.

40. The method as set forth in claim 29 further comprising controlling an amount of a mass of the sorbent particles to be mixed with the fly ash particles.

41. The method as set forth in claim 29 further comprising heating at least one fluid which is used during the beneficiating of the fly ash particles at least during a startup period.

42. The method as set forth in claim 29 wherein the beneficiation further comprises providing at least one fluid during the beneficiation.

43. The method as set forth in claim 42 wherein the providing at least one fluid further comprises heating the at least one fluid during a startup period.

\* \* \* \* \*

UNITED STATES PATENT AND TRADEMARK OFFICE
CERTIFICATE OF CORRECTION

| | | |
|---|---|---|
| PATENT NO. | : 7,641,878 B2 | Page 1 of 1 |
| APPLICATION NO. | : 11/358575 | |
| DATED | : January 5, 2010 | |
| INVENTOR(S) | : Cochran et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 711 days.

Signed and Sealed this

Sixteenth Day of November, 2010

David J. Kappos
*Director of the United States Patent and Trademark Office*